Sept. 16, 1941.  F. E. BEST  2,256,234
AIRPLANE WING AND FUSELAGE
Filed April 11, 1939
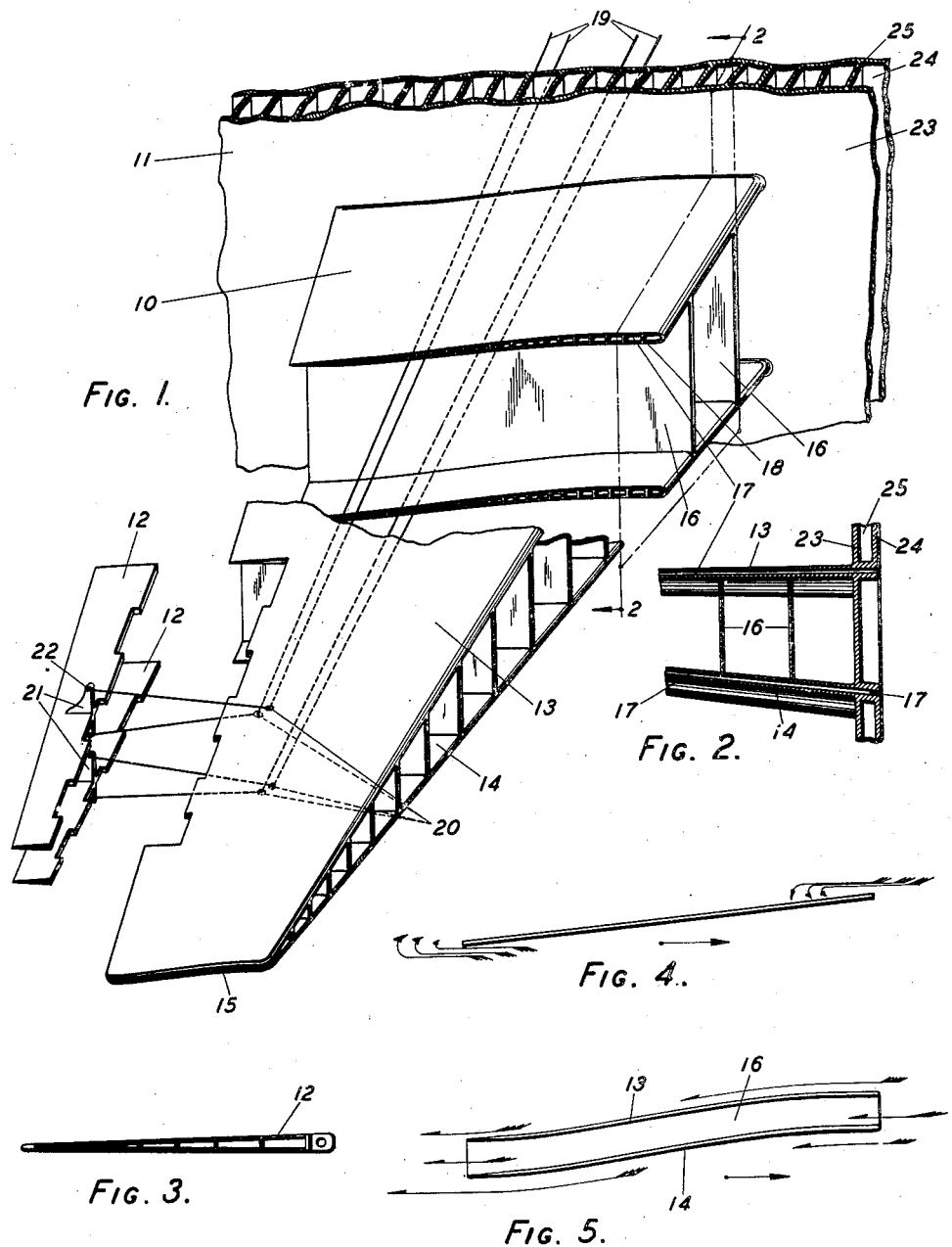
Frank Ellison Best
INVENTOR.

Patented Sept. 16, 1941

2,256,234

UNITED STATES PATENT OFFICE 2,256,234

AIRPLANE WING AND FUSELAGE

Frank Ellison Best, Indianapolis, Ind.

Application April 11, 1939, Serial No. 267,263

1 Claim. (Cl. 244—117)

Nature and object

My invention relates to improvements in airplane wings and fuselage and process for making same, and the principal objects of my invention are:

First, to provide airplane wings and fuselage that can be moulded or die cast of any suitable materials such as tenite or dowmetal, to cheapen and quicken the manufacturing processes.

Second, to provide wings of tapering multiple box kite construction to lessen the air resistance to the forward movement of said wings.

Third, to curve the top and bottom lines as viewed in the transverse section of the wing to smooth out the lines of airflow and thus reduce the retardative eddies and swirls thereabouts.

Fourth, to make a light, sturdy, flexibly rigid structure of practical utility.

Drawing

I obtain these and other objects by means illustrated in the accompanying drawing and description in which:

Fig. 1 shows a fragmentary perspective view of a wing and section of the fuselage.

Fig. 2 is a reduced fragmentary longitudinal section of the wing and transverse section of a portion of the adjoining fuselage taken on plane 2—2.

Fig. 3 is a transverse section of an aileron.

Fig. 4 illustrates the air swirls about a thin, flat piece of material being moved through the air at a lifting angle.

Fig. 5 illustrates the smooth air flow, free of swirls, of a typical lifting wing section illustrating a principle of my invention.

Description

My device consists of wing element 10 and fuselage element 11 preferably integral therewith, having one or more ailerons 12 adapted to be hinged thereto as shown.

The general wing construction consists of two converging sheets 13 and 14 preferably straight or nearly straight in their longitudinal cross section joined at or near their outer extremity 15. These sheets are preferably integral with, but may be anchored to, fuselage element by any suitable means. They are held in spaced relation at close intervals by transverse sheets 16 preferably integral therewith or firmly secured thereto.

Sheets 13 and 14 are preferably provided, Fig. 1, with tapering holes 17 that run much of their length.

These holes are close together leaving reinforcing webs 18 therebetween.

The aileron controls 19 secured to aileron horns 21 in eyes 22 therein, are nestled in holes 17 entering same through suitable eyelets 20.

The fuselage is also made of two sheets of material 23 and 24 held rigidly in spaced relation by webs 25 integral therewith or rigidly secured thereto.

Sheets 13 and 14 are preferably not flat but rather slightly curved as illustrated Fig. 5 to reduce eddy currents thereabouts to a minimum.

They also may be provided with holes as shown Fig. 1, or be solid as shown Fig. 5.

Thus is provided a light rugged structure adapted to be quickly and easily made by the moulding or die casting process.

The fuselage may be moulded in sections or the whole plane, wings and fuselage complete or nearly complete, may be moulded, die cast, or otherwise fabricated in one integral piece.

Wires, cables, rods, wire mesh, fabrics and so forth may be used advantageously as reinforcing materials therein to strengthen the structure.

Having thus described my invention, what I claim as new and desire to secure by Letters Patent of the United States of America is:

In an airplane having wings and a fuselage, a wing comprising sheets substantially straight lengthwise of said wing, separated at their respective junctures with the fuselage but converging to a common juncture near the outer end of said wing, said sheets being spaced apart at intervals by transverse plates rigidly joined therewith, said sheets being thicker near the fuselage and thinner outward therefrom, said sheets being substantially equidistant apart and slightly curved downwardly from their front edge toward their rear edge as respects their transverse profile, said sheets also having tapering holes substantially lengthwise thereof from small holes at the wing tip end to larger holes at the fuselage end thereof, said holes forming thin reinforcing webs substantially lengthwise of the wing therebetween.

FRANK ELLISON BEST.